US007904546B1

(12) United States Patent
Banda et al.

(10) Patent No.: US 7,904,546 B1
(45) Date of Patent: Mar. 8, 2011

(54) MANAGING PROCESSES ON A NETWORK DEVICE

(75) Inventors: Seenu Banda, Sunnyvale, CA (US); Robert Haragan, Jr., Los Altos, CA (US); Jeffrey Kidd, Los Altos, CA (US); Andrew McRae, Berowra (AU)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1026 days.

(21) Appl. No.: 11/349,061

(22) Filed: Feb. 6, 2006

Related U.S. Application Data

(63) Continuation-in-part of application No. 10/950,253, filed on Sep. 27, 2004.

(51) Int. Cl.
*G06F 15/173* (2006.01)

(52) U.S. Cl. ........................................... 709/224

(58) Field of Classification Search .................. 370/216, 370/384, 462, 535, 395.1, 392, 389, 369; 600/493; 707/203; 711/145, 151, 153; 709/251, 709/232, 231, 225, 217, 200, 238, 223, 201; 717/168
See application file for complete search history.

(56) References Cited

U.S. PATENT DOCUMENTS

| 5,938,732 | A * | 8/1999 | Lim et al. ....................... 709/229 |
|---|---|---|---|
| 6,332,198 | B1 * | 12/2001 | Simons et al. ..................... 714/6 |
| 6,639,910 | B1 | 10/2003 | Provencher et al. |
| 6,785,843 | B1 * | 8/2004 | McRae et al. .................... 714/23 |
| 7,330,467 | B2 | 2/2008 | Sharma |
| 2002/0073409 | A1 * | 6/2002 | Lundback et al. ............ 717/170 |
| 2002/0141429 | A1 | 10/2002 | Pegrum et al. |
| 2002/0165961 | A1 * | 11/2002 | Everdell et al. ................ 709/225 |
| 2002/0174207 | A1 | 11/2002 | Battou |
| 2003/0163600 | A1 | 8/2003 | Lanikinen et al. |
| 2004/0153749 | A1 * | 8/2004 | Schwarm et al. ................ 714/11 |
| 2005/0251584 | A1 | 11/2005 | Monga et al. |
| 2006/0013125 | A1 | 1/2006 | Vasseur et al. |

OTHER PUBLICATIONS

McRae, Andrew. "A UNIX Task Broker." Megadata Pty Ltd. http://au.netd.com/papers/sysman.pdf.
V. Srinivasan et al., "Fast and Scalable Layer Four Switching," Proceedings of ACM SIGCOMM '98, pp. 191-202, Sep. 1998.
S. Valluru, Classifying Packets in a Single Pass, Network World, Jul. 18, 2005.
T. V. Lakshman and D. Stiliadis, "High-Speed Policy-Based Packet Forwarding Using Efficient Multi-Dimensional Range Matching," Proceedings of SIGCOMM '98, pp. 203-214, 1998.
Pankaj Gupta and Nick McKeown, "Packet Classification on Multiple Fields", Proceedings of SIGCOMM '99, pp. 147-160, 1999.
Pankaj Gupta and Nick McKeown, "Algorithms for Packet Classification," Published in IEEE Network, vol. 15:2, 2001, pp. 24-32.
Dawson R. Engler and M. Frans Kaashoek, "DPF: Fast, Flexible Message Demultiplexing Using Dynamic Code Generation," Published in Proceedings of SIGCOMM '96, 1996, pp. 53-59.

(Continued)

*Primary Examiner* — Wing F Chan
*Assistant Examiner* — Charles Murphy
(74) *Attorney, Agent, or Firm* — Wall & Tong, LLP

(57) ABSTRACT

Managing processes on a network device is disclosed. A set of processes running on a network device may be monitored and managed by a set of one or more dedicated components. In some embodiments, if a process on a first management processor on a first line card has at least in part failed, the process may be migrated to a second management processor on a second line card. If a request for the migrated process is received, it is directed to the second management processor on the second line card.

27 Claims, 10 Drawing Sheets

OTHER PUBLICATIONS

Mary L. Baily et al., "Pathfinder: A Pattern-Based Packet Classifier," Published in Proceedings of the First Symposium on Operating Systems Design and Implementation, Usenix Association, Nov. 1994.

Andrew McRea, "An Infrastructure for Deterministic Packet Classification," http://mcrae.homeunix.net/papers/packet_class/index.html.

Andrew McRea, "High Speed Packet Classification", http://mcrae.homeunix.net/papers/packet_class/html/packet_classify_files/slide0003.htm.

Srinivasan Venkatachary, "Fast and Efficient Internet Lookups," Sever Institute of Technology, Doctor of Science Degree, Dissertation Acceptance, Jun. 29, 1999.

* cited by examiner

|  | Firewall 202 | IP 204 | Network Interfaces 206 | ... |  |
|---|---|---|---|---|---|
| Management Plane | Configuration, define policy, virus rules | Static route configuration, routing policy rules, addressing data | Slot provisioning, configuration of interface types or encapsulations |  |  |
| Control Plane | Rulesets, policy tables | Routing protocols, routing information base | Interface states, bandwidth summaries, session management |  |  |
| Data Plane | Optimized filtering rules, packet matching tables | Forwarding table | Carrier state, forwarding end points, etc. |  |  |

MANAGING PROCESSES ON A NETWORK DEVICE

CROSS REFERENCE TO OTHER APPLICATIONS

This application is a continuation in part of U.S. patent application Ser. No. 10/950,253 entitled "System and Method for Enabling Management Functions in a Network, filed Sep. 27, 2004, which is incorporated herein by reference for all purposes.

BACKGROUND OF THE INVENTION

Typically, the failure of one or more processes and/or modules of a network device may affect the functionality of the network device. Such a failure often results in disruptions of services provided by the network device and may require the network device to be restarted and/or may require external intervention. In order to maintain the resiliency of a network device even during a failure of a process or module, it would be useful for a network device to be able to automatically detect failed processes and/or modules and restart the failed processes on correctly functioning modules so that the operation of the network device is not disrupted and/or compromised.

Thus, there is a need for an improved way to manage processes on a network device.

BRIEF DESCRIPTION OF THE DRAWINGS

Various embodiments of the invention are disclosed in the following detailed description and the accompanying drawings.

FIG. 2 illustrates an embodiment of a manner in which features of a network device may be implemented across multiple independent planes.

DETAILED DESCRIPTION

Figure 1:
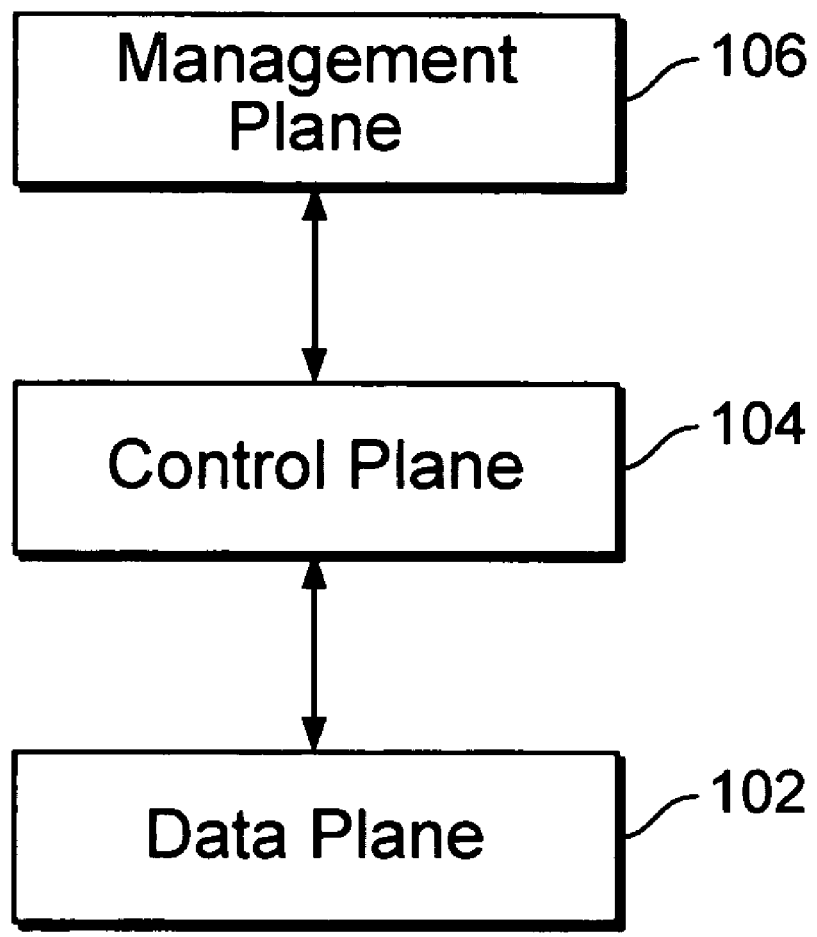
FIG. 1 illustrates an embodiment of three conceptual planes over which a feature may be implemented in a network device.

The invention can be implemented in numerous ways, including as a process, an apparatus, a system, a composition of matter, a computer readable medium such as a computer readable storage medium or a computer network. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing processes on a network device is disclosed. A set of processes running on a network device may be monitored and managed by a set of one or more dedicated components. In some embodiments, if a process on a first management processor on a first line card has at least in part failed, the process may be migrated to a second management processor on a second line card. If a request for the migrated process is received, it is directed to the second management processor on the second line card.

The implementation of various processes, applications, protocols, and/or nodes (sometimes referred to as "features" herein) on network devices, such as routers and gateways, is typically distributed over two planes: a control plane and a data plane. In such configurations, the data plane includes data functions, and the control plane typically includes control functions and management functions. As described in more detail in U.S. patent application Ser. No. 10/950,253 entitled "System and Method for Enabling Management Functions in a Network", filed Sep. 27, 2004, it is sometimes advantageous to distill out the management functions of the control plane into a separate and independent management plane.

In typical configurations, it is often the case that when one or more components of a feature of a network device fail, the entire feature fails or the functionalities of other components of the feature are compromised since the various components of a feature are typically strongly coupled and/or intertwined. Such a failure and/or compromising of a feature can be mitigated or even avoided by implementing the various components of the feature over a plurality of independent planes, such as independent management, control, and data planes. In such configurations, when one or more components of a feature in one plane fail, the entire feature may not be compromised because other components of the feature in one or more of the other planes may not be affected and may be able to recover, restart, or reinstantiate the failed or compromised components of the feature. Thus, the resiliency of a network device may be achieved at least in part by implementing a feature over multiple independent planes or layers. Although the implementation of a feature over a management plane, control plane, and data plane is described in detail herein, any other appropriate combination of planes may be employed.

FIG. 1 illustrates an embodiment of three conceptual planes over which a feature may be implemented in a network device. As depicted, the three planes comprise a data plane 102, a control plane 104, and a management plane 106. Data functions associated with a feature, such as packet processing and forwarding, are implemented on data plane 102; control functions associated with a feature, such as signaling and routing, are implemented on control plane 104; and management functions associated with a feature, such as supervision, configuration, and monitoring, are implemented on management plane 106. Since the essential functions of each plane are different, it is possible to decouple the planes so that at least most of the functionality of each plane is independent from that of the other planes. Such a configuration results in a more modular and robust feature to be implemented on an associated network device. For example, if the data plane goes down, the failure of the data plane can be isolated and corrected without affecting the functionality of the other planes and requiring the entire system to be restarted. The independence of the planes may be implemented with various kinds of boundaries, such as one or more of hardware separation, process boundaries, and/or programmatic modularization.

A feature of a network device may have separate components for implementing and supporting the feature at the data plane, control plane, and management plane levels in a network device. Since the requirements at each plane may be different, the functions and data structures needed at each plane to implement the feature may be different even though the same or similar data may be used by the different planes to implement the feature. The interaction and communication between the planes may be codified through an Application Program Interface (API) or messaging communication and may be feature dependent.

Typically, multiple features of a network device share at least some of the same resources, and, as a result, their performance may be closely coupled. For example, a firewall feature and intrusion detection feature may share at least some of the same code, so if there ever is a problem with the code, both features may be affected. It is, therefore, desirable for each feature to be independent from other features implemented on a network device. In some embodiments, such independence may be achieved at least in part by having programmatic boundaries between different features. In such cases, a feature or a component of a feature may be implemented as an independently loadable module or object. Even though multiple features or components of multiple features may be parts of the same process, if each feature or component of a feature is an independent module or object within the process, a failure or bug in one module will not affect the other modules. In some embodiments, one or more processes may be separated so that each process is associated with only a single feature. Thus, the resiliency of a network device may be achieved at least in part by using programmatic boundaries and/or process boundaries between features. In some embodiments, hardware boundaries may be used for feature separation.

FIG. 2 illustrates an embodiment of a manner in which features of a network device may be implemented across multiple independent planes. Each row of matrix 200 corresponds to a particular plane and the components and data structures associated with features on that plane, and each column of matrix 200 corresponds to a particular feature in toto, sometimes referred to herein as a "feature stack". The given example specifically depicts firewall 202, Internet Protocol (IP) 204, and network interfaces 206 and the components of these features within each plane. In alternative embodiments, the depicted features may be divided across the three planes in any other appropriate manner and are not limited to the division and/or specifications illustrated in FIG. 2. Other features that may be implemented on a network device may be associated with, for example, IPSEC decryption, access control lists, filtering, denial of service, intrusion detection, intrusion prevention, anti-virus, network address translation, protocol anomaly detection, signature matching, quality of service, virtual private network, etc.

Both dimensions of matrix 200 offer feature modularity, which promotes feature robustness and resiliency. The layers or planes over which a feature stack is implemented are independent from one another on a software and/or hardware level, so that problems in feature components in one layer do not affect and may be rectified by components of the feature in other layers in the stack. In some embodiments, resiliency may at least in part be hierarchical, so that a failed or compromised feature component in one layer is fixed by a corresponding component in the next higher layer in the feature stack. Although, some interaction and communication as well as sharing of resources may exist between different features (i.e. the different columns of matrix 200), each feature is independent at least at a software level and does not affect the functionality of other features. Thus, in matrix 200, different features as well as layers within each feature are strongly decoupled.

Different paths for communication and/or interaction may exist between elements of matrix 200 along its two dimensions. A peer relationship and interface may exist between different features at any particular plane. Peer interfaces should introduce no or little dependency between features. The peer relationships and interfaces may be different for different planes. A layer relationship and interface exists between the elements of a feature stack. In some embodiments, layer interfaces may be feature dependent and/or module dependent (i.e. the physical module of a network device on which the feature is implemented) and may operate independently from any peer interfaces. The functionality of a feature may be maintained at the peer level when, for example, one or more layers of a feature are not functional due to software and/or hardware issues.

Figure 3:
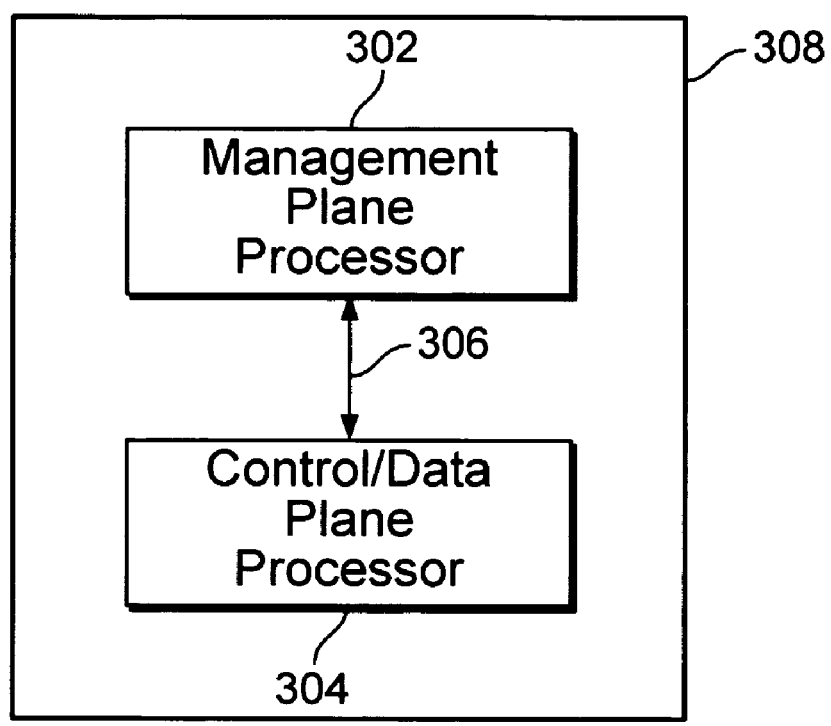
FIG. 3 illustrates an embodiment of a manner in which an independent data plane, control plane, and management plane may be implemented in a network device.

FIG. 3 illustrates an embodiment of a manner in which an independent data plane, control plane, and management plane may be implemented in a network device. In the given example, the isolation and independence of the management plane is achieved at least in part via a separate, dedicated hardware layer, management plane processor 302, that implements the functionality of the management plane. The control plane and data plane are implemented on a separate hardware layer, control/data plane processor 304. Even though in the given example the hardware architecture does not place strong boundaries between the control plane and data plane, the two planes are separated at least by process boundaries. In alternative embodiments, the control plane and data plane may be implemented using separate processors so that both hardware and software boundaries exist. Interconnects 306 between management plane processor 302 and control/data plane processor 304 enable communication between the two processors. As depicted in the given example, management plane processor 302 and control/data plane processor 304 are included in a module 308 of an associated network device. Although not depicted, module 308 may include any other appropriate components, such as a module-specific processor, memory, communications interface, etc. In some embodiments, module 308 corresponds to a line card. In some embodiments, a network device such as a router or gateway includes a plurality of line cards. Module 308 may correspond to any other appropriate module or component of a network device, such as a switch card, application engine, GAME card, processor, one or more chassis resources, etc.

In some embodiments, one or more physical modules in a network device each include a management plane processor that implements appropriate management functions for the module and/or other modules in the network device without having to rely on the control plane and/or the data plane as intermediaries. In some embodiments, the management plane processors across all or a subset of such modules form the independent management plane of a network device and implement and provide management functions for the network device. In some embodiments, the management plane has an independent and separate communication path and peer interface from the control plane and the data plane that allows the set of management plane processors to communicate amongst themselves and operate with complete functionality regardless of the state of the control plane and the data plane. In alternative embodiments, the management plane may be implemented on a single, centralized management processor employing a dedicated management bus to communicate with and provide management functions for each module.

Figure 4:
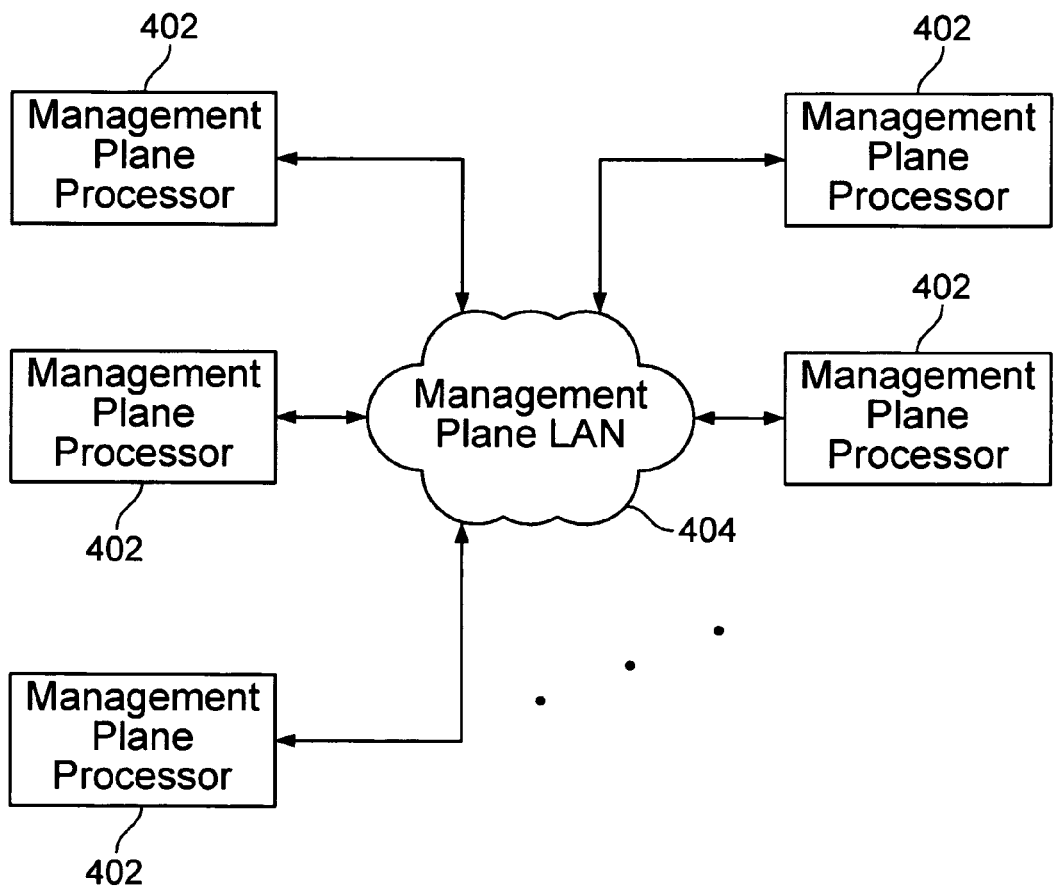
FIG. 4 illustrates an embodiment of a manner in which a management plane may be implemented.

FIG. 4 illustrates an embodiment of a manner in which a management plane may be implemented. A plurality of management plane processors 402 are connected by an internal network, management plane LAN (Local Area Network) 404. In some embodiments, each of the plurality of management plane processors 402 is associated with a module, such as module 308 of FIG. 3, of a network device. In the configuration depicted in FIG. 4, the management plane can be viewed as a cluster of peers 402 interconnected by a private, internal network 404. In some embodiments, management plane LAN 404 is duplicated for redundancy. Externally, the cluster of peers 402 may appear as a single entity. Each peer in the management plane may "own" a set of resources and/or run a set of processes that are managed by that peer. A shared resource and/or process may be offered as a service by its associated management plane processor and may be accessed via management plane LAN 404 by other management plane processors. The resources and processes associated with each peer may vary and may depend on the type of physical module the peer is associated with. Depending on the type of physical module with which a peer is associated, it may have access to certain resources, such as hardware resources associated with the module, and perform certain tasks for its associated module that may not be made available or are only limitedly made available to the other peers. The cluster of peers 402 collectively forms the management plane and provides the requisite management functionality of the system. In some embodiments, a control plane and/or data plane may be similarly implemented as a cluster of peers interconnected by a private network.

The management plane conceptually functions as the "brain" of a network device. The management functionality provided by the management plane may include, for example, managing and configuring features implemented on an associated network device. In some embodiments, a process, application, and/or feature implemented at the management plane level is distributed across multiple peer management plane processors. Multiple instances of the same management plane process may be executed by one or more management plane processors. If a task or process is to be performed by only a single management plane processor, the management plane processors capable of performing the task may arbitrate among themselves to determine which management plane processor is to run the task. If the management plane processor running a process fails, the remaining management plane processors capable of running the process may negotiate to determine which one runs a new instance of the process. In some embodiments, the distribution of one or more management plane processes across the peer management plane processors is based at least in part on load balancing.

Other management functionality provided by the management plane includes, but is not limited to, module management (e.g., insertion and removal), redundancy and availability management, storage and management of persistent data, web interface management, management of requests and access to a Command Line Interface (CLI) (e.g., via a console, secure shell (ssh), telnet, etc.), management of Hyper Text Transfer Protocol (HTTP) requests and data, management of Simple Network Management Protocol (SNMP) requests and data, management of logging and statistics collation and presentation, etc.

In some embodiments, the management plane portion of a feature includes a dedicated feature server that configures and initializes the feature and is responsible for the correct operation of the feature over an associated feature stack. Such a feature server may be responsible for reinstantiating or recovering feature components in the feature stack that fail or are otherwise compromised. In some embodiments, the management functionality provided by the management plane includes managing the resources of an associated network device, such as power, memory, processor bandwidth, etc., and/or monitoring and managing the use and consumption of such resources. The implementation of the management plane as a cluster creates redundancy and resiliency in an associated network device. Each module added to an associated network device that includes a management plane processor increases system availability. As described in more detail below, the cluster of peers may monitor and manage each other's health so that if, for example, a process fails on one management plane processor, the process is restarted either on that management plane processor or migrated to another peer management plane processor.

In order to maintain system availability and resiliency, it may be desirable to monitor processes and/or processors of a network device for proper operation and take appropriate corrective actions upon detection of problems. In some embodiments, the processes associated with a network device may be monitored, managed, and/or controlled by a dedicated component, sometimes referred to herein as a "task manager". In some embodiments, an instance of a task manager application is executed on a processor, and the task manager of the processor may communicate with other instances of task managers on peer processors. In some embodiments, a task manager facilitates the addition of new processes to a system and/or facilitates upgrading old processes when newer versions become available. In some embodiments, a task manager includes and provides an internal database of services that are mapped to processes so that clients can be given the host addresses and/or ports by which desired services may be accessed. A task manager may respond to queries from clients about which services are available. In some embodiments, a task manager runs as the primary process, and all or a subset of other processes are started from the task manager. A task manager may be responsible for detecting failed processes, logging failed processes, detecting when processes are continually failing, restarting processes, migrating processes to other processors, managing process upgrades, load balancing, etc. The task manager itself may be started with a bootstrap set of processes. In some embodiments, a task manager may detect and report the failure of one or more management plane processors of a network device.

Although task managers may be described as software modules running on processors, task managers may be implemented by any appropriate combination of hardware and/or software components of a network device. Although task managers may be described with respect to the management plane processors of a network device, one or more task managers may be similarly employed by and provide similar functionality to any other processors and/or peer processors of the network device, such as processors associated with the control plane and/or data plane, module-specific processors of a network device, etc.

Figure 5:
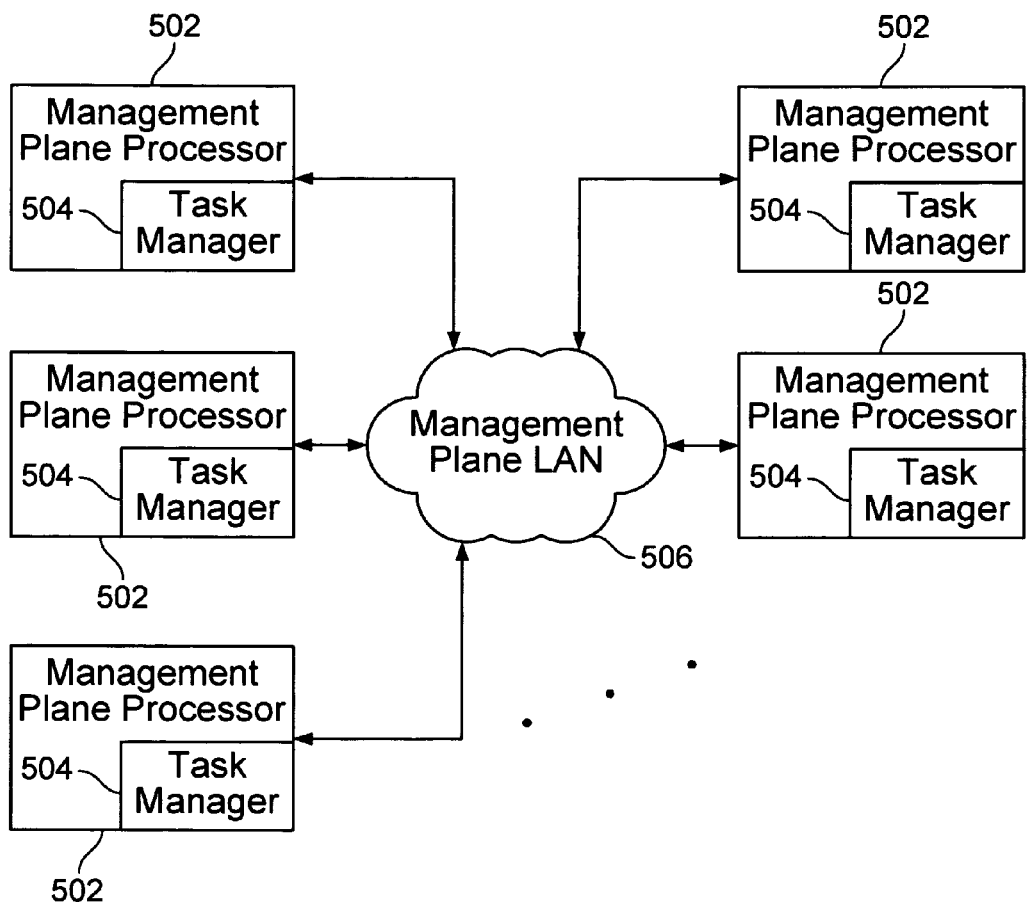
FIG. 5 illustrates an embodiment of a manner in which task managers may be deployed on management plane processors.

FIG. 5 illustrates an embodiment of a manner in which task managers may be deployed on management plane processors. As depicted in the given example, each management plane processor 502 includes an instance of a task manager application 504. The task manager instances 504 communicate as a cluster of peers across management plane LAN 506 to track and monitor services that are running on the management plane processors 502. In some embodiments, management plane processors 502 and management plane LAN 506 correspond to management plane processors 402 and management plane LAN 404, respectively, of FIG. 4. In some embodiments, each instance of a task manager 504 is responsible for monitoring and/or ensuring correct operation of processes running on the management plane processor 502 on which that instance of the task manager 504 is included in. In some embodiments, each instance of a task manager 504 is responsible for monitoring and/or ensuring correct operation of the processes and/or services that it initiated. Alternatively, the task managers 504 may divide the tasks of supervising and/or ensuring the correct operation of processes in any other appropriate manner. In some embodiments, the task managers 504 each maintain a services directory that can be used to determine the host(s) associated with each service. The task managers 504 running on the management plane coordinate amongst themselves to ensure that the necessary services are available and restart such services in the event of failures. In some embodiments, one or more task managers 504 facilitate the migration of a service from one host to another, for example, due to a failure or problems on the previous host of the service, due to load balancing, etc. In such cases, the task managers 504 may exchange such service migration information amongst themselves so that the services directory of each task manager can be updated to accurately reflect the current host(s) of a service. In the event of detecting the failure of a management plane processor, the task managers 504 can determine which processes were being run by the failed management plane processor using their services directories, restart the failed processes on other management plane processors, and accordingly update their services directories.

In some embodiments, the processes running on the management plane processors may be considered as offering particular services to clients. A service can be identified with a single process or a set of processes running on one or more of the management plane processors, and activation of a service results in the starting of all of the processes with which the service is associated. In some embodiments, only one instance of a particular service may be executed at any given instance even though multiple management plane processors may have the capability of running the process offering this service. In some embodiments, a process that offers a service is mapped to a service identifier in the services directory associated with each task manager. The services directory of a task manager may be used as a registration database for responding to service requests from clients and directing the clients to specific hosts. Service proxies may be installed that point to services on other hosts, and/or service ports may be added that indicate the UDP or TCP port number that a service is accessible on. Service ports may be slaved to a master service so that only if the master service is available will the service ports be available. In some embodiments, a service may not be associated with a process that is started and monitored by a task manager but may be associated with a separately executed process. Such services may still be included in the services directories of the task managers. In some embodiments, a process is not associated with an identified service and belongs to a default local service (e.g., a reserved internal service). In the cases where a process is defined without being associated with a service, a task manager may provide local management for the process, and the process may not be a part of the services directory.

The task managers track the availability of the services running on the management plane. If at some point a process crashes or exits, a task manager may detect the process exit, log the failure, and/or inform the other task managers of the failure of the process and/or associated services. In the event that the process is part of a set of processors associated with a service and the failed process is flagged as being a critical process, the other processes in the set may be forcibly terminated. If the process is flagged to be restarted, one or more attempts may be made to restart the process. The process may be restarted on the processor on which it crashed, or the process may be migrated to another processor that can run the process. Thus, if a process dies or is killed, attempts will be made to automatically restart it without requiring external intervention. If the process is detected as unstable due to, for example, several crashes in a row within a certain timeframe and a service is associated with the process, the service may be marked unrunnable.

In some embodiments, an active signal or "heartbeat" is sent from a process to a task manager monitoring the process that indicates that the process has performed some level of self-checking and is reporting correct operation status insofar as the internal state of the process can be self-checked. In the event of the process not providing this heartbeat within a certain timeframe, a task manager may kill the process and assume that the process has failed. In some embodiments, a process is configured to check if an associated task manager has exited unexpectedly and, if so, terminates itself.

Figure 6:
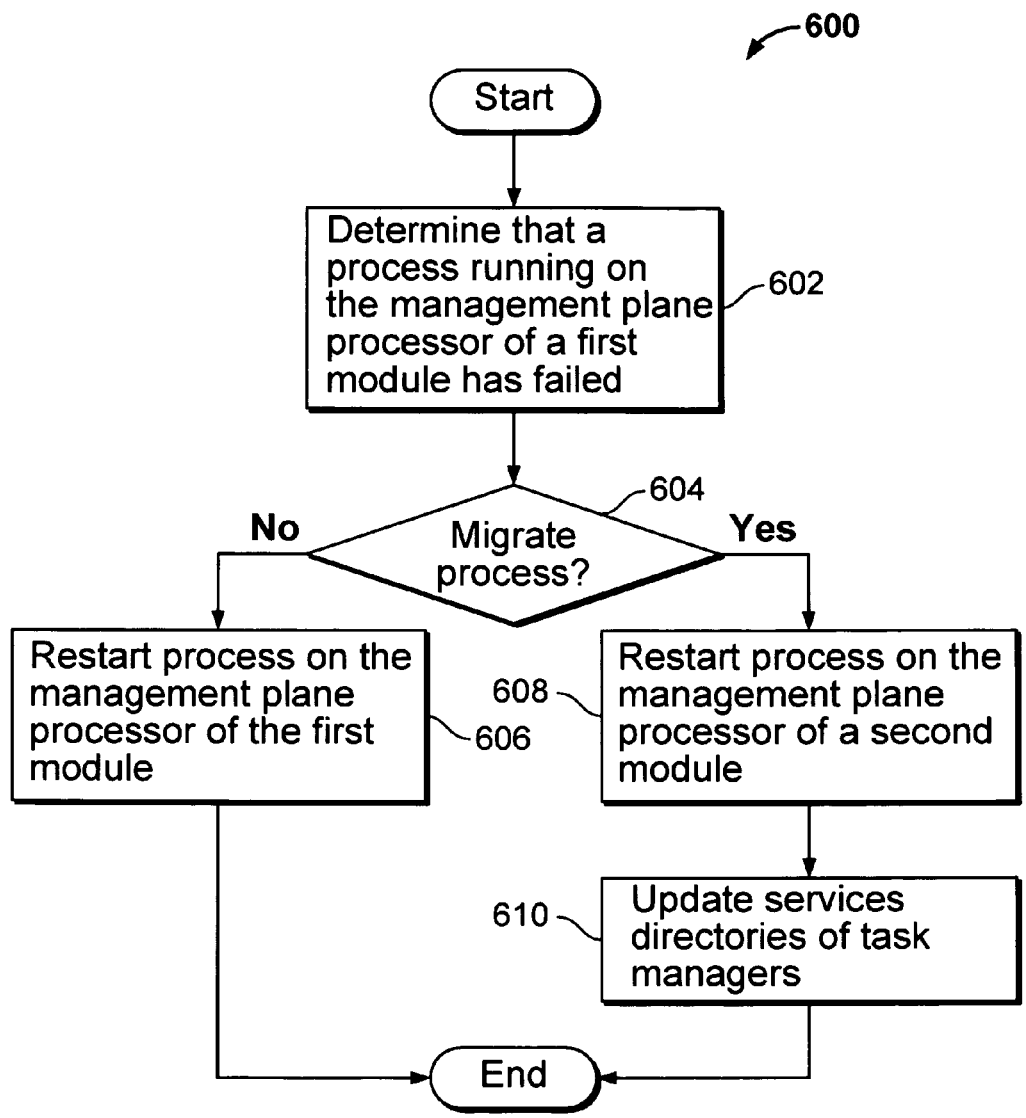
FIG. 6 illustrates an embodiment of a process for restarting a failed process on a management processor.

FIG. 6 illustrates an embodiment of a process for restarting a failed process on a management plane processor. In some embodiments, process 600 is performed by one or more task managers. At 602, it is determined that a process running on the management plane processor of a first module has failed. The determination of process failure at 602 may be made by a task manager instance running on the management plane processor of the first module and/or one or more task manager instances running on peer management plane processors on other modules. The determination of process failure at 602 may be made, for example, when a heartbeat associated with the process is not being received from the process and/or an anomaly exists in the heartbeat being received by the process, the management plane processor running the process has failed, the process has been forcibly terminated because another associated process has failed, the task manager and/or management plane processor associated with providing the process is not responding, etc. At 604, it is determined whether to migrate the failed process detected at 602 to the management plane processor of a second module. If it is determined at 604 not to migrate the process to the management plane processor of a second module, for example, because the management plane processor of the first module is capable of correctly running the process, the process is restarted on the management plane processor of the first module at 606. If it is determined at 604 to migrate the process, for example, because the management plane processor of the first module is not able to the run the process, the process is restarted on the management plane processor of a second module capable of supporting the process at 608. At 610, the services directories of the task managers are updated to reflect the correct host and/or ports of the process and/or service associated with the process. Thus, if a process has migrated and it is subsequently requested by a client, the task managers provide information associated with the management plane processor on the second module. In some embodiments, the determination whether to migrate the process to another management plane processor at 604 is based at least in part on load balancing.

Figure 7:
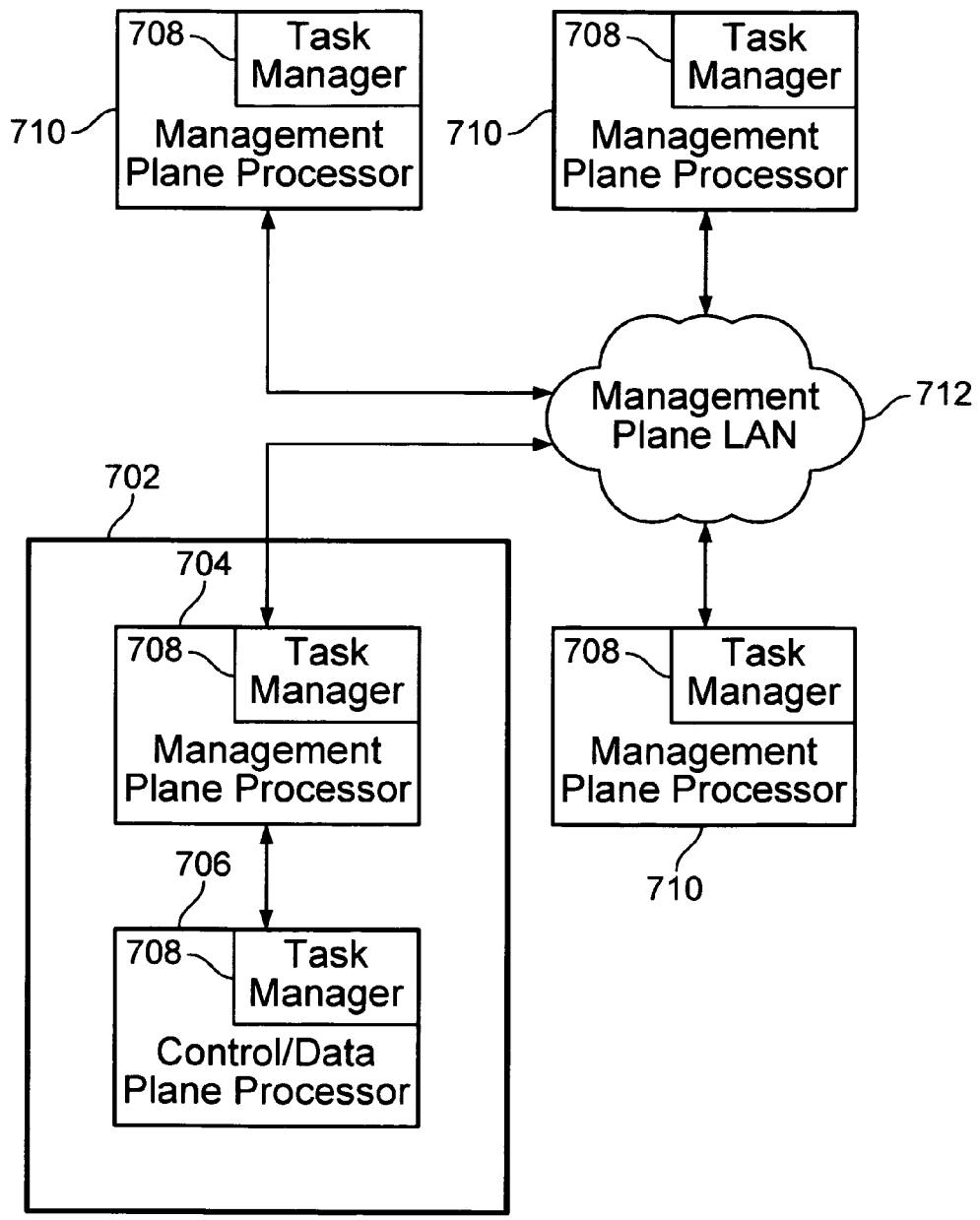
FIG. 7 illustrates an embodiment of a manner in which task managers may be deployed on the management plane processor and the control/data plane processor of a module of a network device.

FIG. 7 illustrates an embodiment of a manner in which task managers may be deployed on the management plane processor and the control/data plane processor of a module of a network device. In the given example, module 702 includes a management plane processor 704 and a control/data plane processor 706, each of which includes an instance of a task manager 708. In some embodiments, module 702, management plane processor 704, and control/data plane processor 706 correspond to module 308, management plane processor 302, and control/data plane processor 304, respectively, of FIG. 3. Although not depicted, module 702 may include other appropriate components, such as a communications interface, memory, interconnects between components, other processors, module-specific components, etc. Module 702 may correspond to any appropriate network device component such as a line card, switch card, etc. The task managers on the management plane processor 704 and the control/data plane processor 706 may both be associated with the monitoring and management of management plane processes and services. In alternative embodiments, the task manager on the control/data plane processor 706 may be associated with the monitoring and management of control and/or data plane processes and services, possibly across multiple peers.

Management plane processors 710 on other modules of an associated network device are connected to management plane processor 704 of module 702 via a private, internal network, management plane LAN 712. In some embodiments, management plane processors 704/710 and management plane LAN 712 correspond to management plane processors 502 and management plane LAN 506, respectively, of FIG. 5. Although not shown in FIG. 7, in some embodiments, control/data plane processor 706 may be connected to and communicate with one or more control/data plane processors on other modules of an associated network device.

As depicted in the given example, the provisioning of management functionality to control/data plane processor 706 of a module 702 is not limited to be provided by the management plane processor 704 included on module 702 but may also be provided by any one or more of the management plane processors 710 on other modules of the network device. The management plane processor 704 of module 702 may serve as an intermediary and facilitates communication between the control/data plane processor 706 on module 702 and the management plane processors 710 on other modules of the network device. In such cases, management plane processor 704 may serve as a proxy for a management plane processor 710 on another module.

As illustrated in the given example, the task manager of the management plane processor 704 may directly communicate and exchange information with the task managers of other management plane processors 710 over management plane LAN 712, but the task manager of the control/data plane processor 706 of module 702 may only directly communicate with the task manager of management plane processor 704 and indirectly communicates with the task managers on the other management plane processors 710 via management plane processor 704 on module 702. In alternative embodiments, the task manager of control/data plane processor 706 has a direct connection to management plane LAN 712.

With the configuration of the given example, when the control/data plane processor 706 needs a management plane service, it can query its associated task manager for the location of the service (e.g., host address and/or ports) and access the service from and/or via management plane processor 704. In some embodiments, the control/data plane processor 706 may not include an instance of a task manager 708 and may instead send a service request to management plane processor 704, which may look up the service in its task manager and provide the service itself and/or provide the connectivity between the control/data plane processor 706 and another management plane processor 710 on another module that is providing the service.

The management plane processors operate on and employ data associated with the internal management and configuration of a network device. In some embodiments, the data plane and/or control plane deal with the data flow through the network device and forward data packets determined to be associated with the management and configuration of the network device to the management plane. In such cases, the management plane processors may not have a direct connection to the network(s) with which the network device is associated. Such a configuration enables further isolation of the management plane and makes it less vulnerable to network attacks.

In some embodiments, communication with the management plane processors is enabled via a management plane gateway. In such configurations, externally, the cluster of management plane processors that comprise the management plane appear as a single entity. The management plane gateway conceptually functions as the front door of the management plane and facilitates communication to and from the management plane processors.

Figure 8:
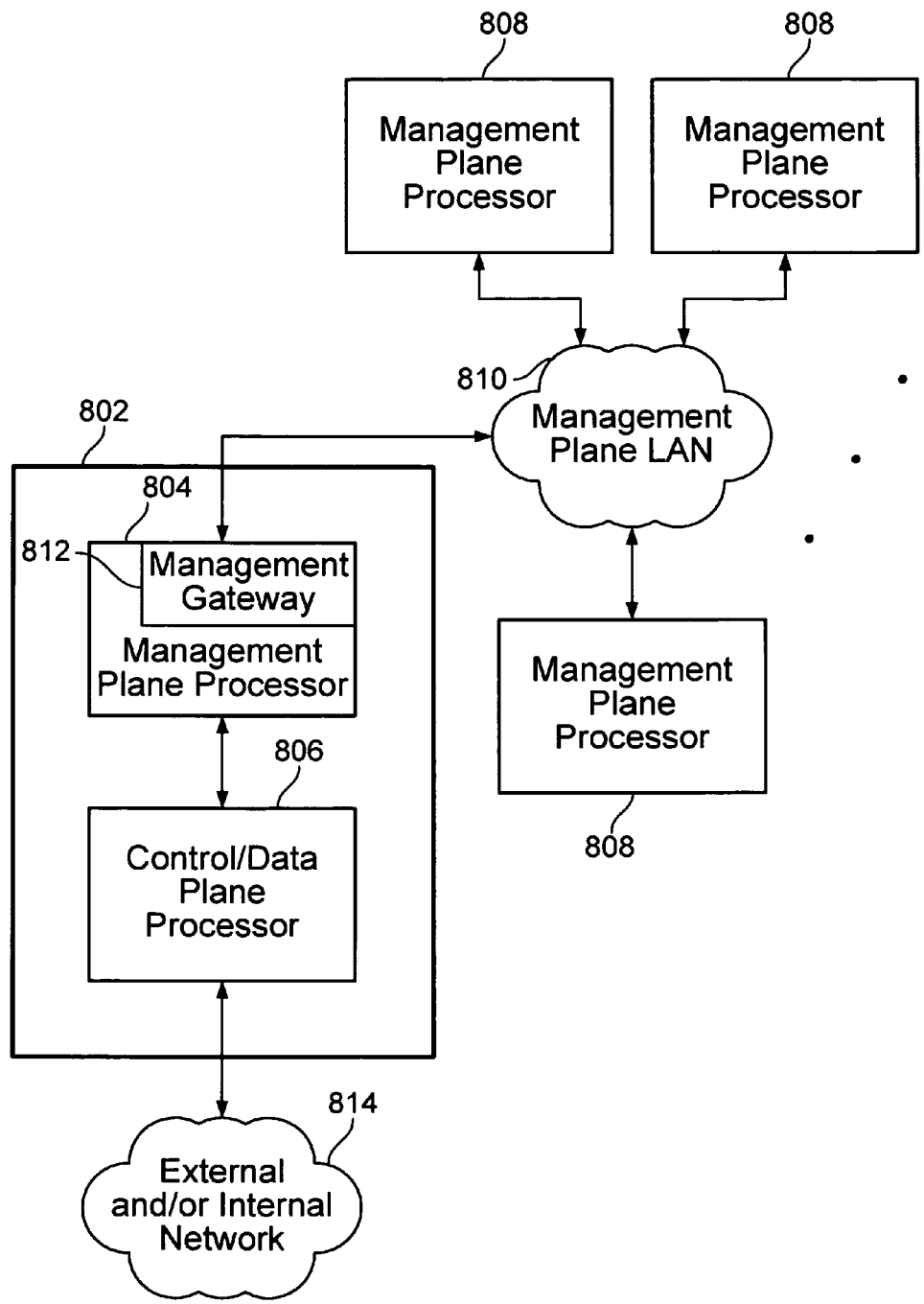
FIG. 8 illustrates an embodiment of a manner in which a management plane gateway facilitates communication to and from the management plane in a module of a network device.

FIG. 8 illustrates an embodiment of a manner in which a management plane gateway facilitates communication to and from the management plane in a module of a network device. In the given example, module 802 includes a management plane processor 804 and a control/data plane processor 806. In some embodiments, module 802, management plane processor 804, and control/data plane processor 806 correspond to module 308, management plane processor 302, and control/data plane processor 304, respectively, of FIG. 3. In some embodiments, module 802, management plane processor 804, and control/data plane processor 806 correspond to module 702, management plane processor 704, and control/data plane processor 706, respectively, of FIG. 7. Module 802 may correspond to any appropriate network device component such as a line card, switch card, etc.

Management plane processors 808 on other modules of an associated network device are connected to management plane processor 804 of module 802 via a private, internal network, management plane LAN 810. In some embodiments, management plane processors 804/808 and management plane LAN 810 correspond to management plane processors 402 and management plane LAN 404, respectively, of FIG. 4. In some embodiments, management plane processors 804/808 and management plane LAN 810 correspond to management plane processors 502 and management plane LAN 506, respectively, of FIG. 5. Although not shown in FIG. 8, in some embodiments, control/data plane processor 806 may be connected to and communicate with one of more control/data plane processors on other modules of an associated network device. In some embodiments, the management plane processors 804/808 and/or control/data plane processor 806 of FIG. 8 each include an instance of a task manager.

As depicted in the given example, in some embodiments, the management plane does not have direct in-band access to an external and/or internal network 814 associated with a network device. In such cases, management plane communication to and from network 814 may at least in part be facilitated by the data and/or control planes. For example, management control data packets and/or requests for management plane services may be first received from network 814 by control/data plane processor 806 and may be forwarded by control/data plane processor 806 to management plane processor 804. At the management plane level, a management plane gateway 812 may receive the forwarded management data; determine one or more management plane services, processes, and/or features the received management data is associated with; receive identification of the management plane processors that are currently associated with the services, processes, and/or features the received management data is associated with, for example, from a services directory of a task manager; perform address translation on the management data; and/or forward the management data to one or more appropriate management plane processors (804 and/or one or more of 808). Likewise, if a process or application on the management plane needs to communicate with an entity accessible via an external and/or internal network 814, the communication may be facilitated by the management plane gateway and/or data and/or control planes.

Management plane gateway 812 effectively enables the encapsulation of the internal modularity of the management plane. An external entity communicating with the management plane may have no knowledge of which one or more management plane processors across a plurality of modules it is communicating with. In some embodiments, management plane gateway 812 comprises an application or process running on a management plane processor 804. In some embodiments, each of the management plane processors of a network device includes an instance of a management plane gateway 812 to provide connectivity to the management plane. In some embodiments, the management plane gateway 812 runs on a single management plane processor and provides its services to one or more other management plane processors over management plane LAN 810. A management plane gateway may be implemented by any appropriate combination of hardware and/or software components of a network device.

Although not depicted, module 802 may include other appropriate components, such as a communications interface, memory, interconnects between components, other processors, module-specific components, etc. The communication between the management plane and an entity on an external and/or internal network 814 may be associated with, for example, requesting and/or provisioning management services and processes; managing, configuring, and/or initializing features and/or components; repairing compromised features and/or components; monitoring the health and/or state of features and/or components; etc. In some embodiments, management plane gateway 812 facilitates communication between the management plane processors (804/808) and other components of module 802 and/or an associated network device, such as control/data plane processor 806.

As described with respect to FIG. 8, in some embodiments, the primary method of accessing the management plane from an associated external and/or internal network is via packets received at the data plane and/or control plane, which are recognized as destined for the management plane and forwarded on to an associated management plane processor which invokes a management plane gateway process to appropriately distribute the packets to one or more management plane processors. In such configurations, in the event of a software and/or hardware failure of the data plane and/or control plane, the management plane may become isolated from the external and/or internal network even though it may be partially, if not fully, functional. Thus, operations that could be used to quickly identify and perhaps rectify the problem via requests to the management plane can not be performed if the only path to the management plane is through the data and/or control planes. It is, therefore, desirable to provide alternative mechanisms of access from an associated network so that connectivity to the management plane can be maintained even during failures in the data and/or control planes.

In some embodiments, an out-of-band management channel (e.g., a modem connection) may be provided for accessing the management plane of a module via a network. In such cases, for example, upon failure of the data plane and/or control plane, the out-of-band management channel may be used to connect to the management plane gateway and/or management plane processor of a module.

In some embodiments, the architecture of a module may be reconfigured when required to provide access to the management plane if or when the data plane and/or control plane go down. Thus, instead of a processor associated with the data plane (e.g., control/data plane processor 806 of FIG. 8) receiving packets from an associated external and/or internal network, in such a reconfigured configuration, for example, packets may be received directly by a module-specific processor via an associated communications interface. Although such a configuration may result in a degradation of performance, in some embodiments, such a failsafe mode may be triggered when the path via the data plane and/or control plane is not available and may be deactivated when the data and/or control planes are functional. In some embodiments, the module-specific processor in such a failsafe mode only accepts packets associated with management from the network and discards other types of packets.

Figure 9:
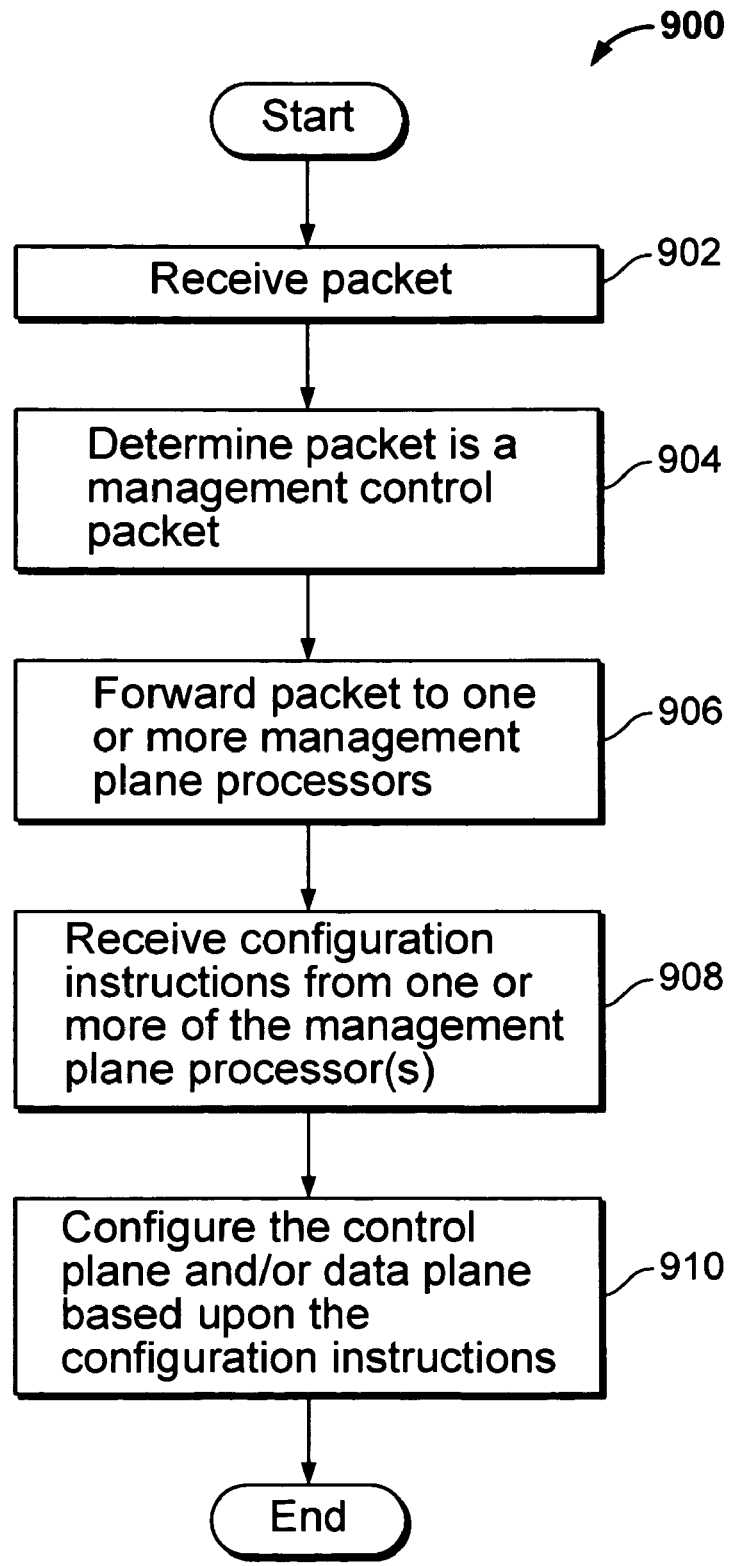
FIG. 9 illustrates an embodiment of a process for configuring the control and/or data planes.

FIG. 9 illustrates an embodiment of a process for configuring the control and/or data planes. Process 900 may be employed by one or more modules of a network device, such as a router or gateway. At 902, a packet is received by a module of a network device. The module may be a network device component, such as a line card, switch card, etc. The packet may be received by the module at 902 from an external and/or internal network associated with the network device. In some embodiments, the packet is received at 902 from the external and/or internal network via the data plane and/or control plane of the module. In alternative embodiments, the packet may be received via an out-of-band connection, such as a modem, or via another component of the module, such as a module-specific processor. In some embodiments, the packet of 902 is generated by a component of the module. In some embodiments, the packet is received at the module at 902 from another module of the network device. At 904, it is determined that the packet is a management control packet. The management control packet may be associated with a management service request, management data, management statistics, configuration data, etc. At 906, the packet is forwarded to one or more management plane processors. In some embodiments, the one or more management plane processors determined to forward the packet to at 906 are determined at least in part by a management plane gateway based upon the management plane services and/or processes with which the packet is associated and which one or more management plane processors are associated with these services and/or processes, which may be determined from the services directory of a task manager. The one or more management plane processors to which the packet is forwarded to at 906 may reside on various modules of the network device. At 908, configuration instructions are received from one or more of the management plane processor(s) to which the packet was forwarded to at 906. In some embodiments, the configuration instructions are first received by a management plane gateway, which subsequently distributes the configuration instructions to the appropriate components of the module. At 910, the control plane and/or data plane are configured or reconfigured based upon the configuration instructions received at 908, and process 900 ends. In some embodiments, based upon the packet received by a particular module at 902, configuration instructions may be received from the management plane on multiple modules of the network device at 908, and the configuration instructions may be employed to configure or reconfigure the control plane and/or data plane of multiple modules of the network device at 910. In some embodiments, the packet received by the module at 902 is also received by other modules of the network device and results in the configuration of the control plane and/or data plane of multiple modules. Process 900 is not limited to configuring the control plane and/or data plane but may be used to configure and/or manage other components of modules of the network device. Although in the given example, process 900 was described with respect to a packet received at 902, process 900 may also be employed with respect to a plurality of packets or a flow or session received at 902.

Figure 10:
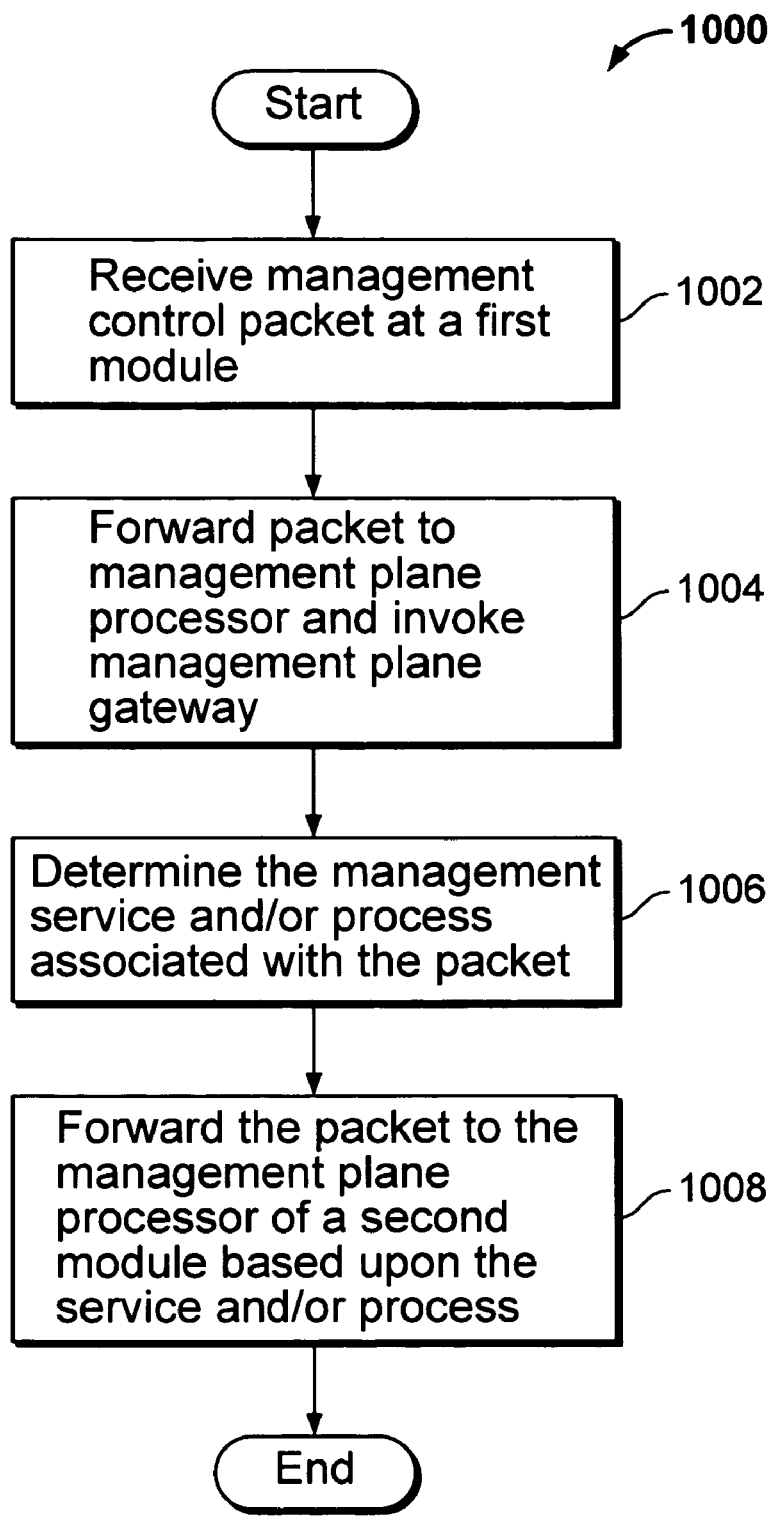
FIG. 10 illustrates an embodiment of a process for communicating management data.

FIG. 10 illustrates an embodiment of a process for communicating management data. Process 1000 may be employed by one or more modules of a network device. The modules may correspond to network device components, such as line cards, switch cards, etc. At 1002, a management control packet is received at a first module of a network device. The management control packet may be associated with a management service request, management data, management statistics, configuration data, etc. The packet may be received by the first module at 1002 from an external and/or internal network associated with the network device. In some embodiments, the packet is received at 1002 from the external and/or internal network via the data plane and/or control plane of the first module. In alternative embodiments, the packet may be received via an out-of-band connection, such as a modem, or via another component of the module, such as a module-specific processor. In some embodiments, the packet of 1002 is generated by a component of the first module. In some embodiments, the packet is received at the first module at 1002 from another module of the network device. At 1004, the packet received at 1002 is forwarded to the management plane processor of the first module, and the management plane gateway is invoked. The management plane gateway may run on the management plane processor of the first module and/or on another peer management plane processor. At 1006, the management service and/or process associated with the packet is determined, for example, by the management plane gateway. In some embodiments, it is determined at 1006 that multiple services and/or processes are associated with the packet. At 1008, the packet is forwarded to the management plane processor of a second module based at least in part upon the service and/or process determined at 1006. In some embodiments, a look-up of the service and/or process determined at 1006 in a services directory of a task manager is performed to identify one or more management plane processors that are associated with the service and/or process with which the packet is associated. In some embodiments, the management plane gateway performs an internal network address translation, so that the packet can be forwarded to the management plane processor on the second module. In some embodiments, the packet may be forwarded to the management plane processors of multiple modules at 1008. In some embodiments, the packet is processed at least in part by the management plane processor of the first module. Although in the given example, process 1000 was described with respect to a single packet received at 1002, process 1000 may also be employed with respect to a plurality of packets or a flow or a session received at 1002.

Although internally a network device may include multiple modules and each such module may include multiple processors for implementing the functionality of the data, control, and management planes, the modularity of the components within the network device and associated modules is masked from an external perspective. Thus, externally, the view of the network device is that it is a single host and that addressing the network device using its IP address will allow in-band access to data plane, control plane, and/or management plane facilities. However, internally this may imply that depending on the facility being addressed, different parts of the system may need to be the end points of the connections.

As described above, the view of the management plane to external entities is that of a single system, although internally it may be comprised of multiple processors over multiple modules. In some embodiments, the control plane and data plane also externally appear as single systems, although each of the control plane and data plane may be comprised of multiple processors over multiple modules.

As described above, in some embodiments, the separation of the data plane, control plane, and management plane includes hardware separation over multiple processors. For example, the management plane of a network device may be implemented on dedicated management plane processors, and the control and data planes may be implemented on separate processors. In such configurations, if the network device is externally addressed as a single system, some level of demultiplexing or classification may be needed to sort out which packets are to be delivered to which processor. Likewise, packets sourced by the processors may need to be masqueraded so that they appear to originate from a single host. In some embodiments, it may be desirable to allow the management plane to be addressed via an out-of-band option, so that a separate connection (such as a modem) can be used to directly connect to the management plane in the event of problems in the main network. In such cases, addressing the network device via a single address may be difficult since the packets may originate from different networks (out-of-band or in-band). Thus, although in some embodiments, it may be desirable for a network device to be addressed as a single system, in alternative embodiments, it may be desirable to be able to separately address the management plane.

In some embodiments, the management plane and the control/data plane of a network device are separately addressable. The management plane can be treated as a separate entity that is accessible via a separate network interface from the control and/or data planes. In such cases, the classification and separation of management plane traffic from control/data plane can be eliminated. A separately addressable management plane may provide a more robust system, since it can be completely isolated from the other planes, if necessary. The provisioning of in-band and out-of-band access to the management plane may be better supported with a separately addressable management plane. A separately addressable management plane may allow the use of certain facilities at both the management plane and the control and/or data planes. In alternative embodiments, all three planes may be separately addressable.

As described herein, the robustness and resiliency of a network device may be achieved at least in part by distributing the features of the network device across multiple independent planes and providing strict boundaries between different features so that they are not closely coupled. In some embodiments, the management plane of the network device is implemented as a cluster of peer processors distributed across various modules of the network device. One or more processes running on the network device may be monitored and/or managed by one or more task managers, which may restart failed processes so that the functionality of the network device is not disrupted and/or compromised.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing access to a process on a network device, comprising:
    decoupling individual planes to thereby allow for a majority of the functionality of each plane to be independent from that of the other planes wherein the individual planes comprise a management plane, control plane and data plane;
    separating each process on each plane by associating each process with a single feature;
    configuring and initializing a feature server for enabling correct operation of the feature including recovery of feature components;
    determining that a process on a first management processor on a first line card on the network device has at least in part failed;
    migrating the process to a second management processor on a second line card on the network device;
    receiving a request for the process; and
    directing the request to the second management processor on the second line card wherein the first line card and the second line card are included in a set of line cards, the first management processor and the second management processor are included in the set of management processors, at least one of a set of task managers is associated with each management processor included in the set of management processors;
    wherein each task manager included in the set of task managers includes a services directory that provides the location of a service, and migrating the process to a second management processor on a second line card includes updating the services directory of each task manager included in the set of task managers so that the process is associated with the second management processor in the services directory of each task manager included in a set of task managers.

2. A method as recited in claim 1, wherein determining that a process on a first management processor on a first line card has at least in part failed comprises determining that the first management processor has at least in part failed.

3. A method as recited in claim 1, wherein determining that a process on a first management processor on a first line card has at least in part failed comprises determining that the process, the first management processor, or both do not respond.

4. A method as recited in claim 1, wherein determining that a process on a first management processor on a first line card has at least in part failed comprises determining that a signal associated with correct process operation is not being received from the process.

5. A method as recited in claim 1, wherein determining that a process on a first management processor on a first line card has at least in part failed comprises detecting an anomaly in a signal associated with correct process operation that is received from the process.

6. A method as recited in claim 1, wherein migrating the process to a second management processor on a second line card is based at least in part on determining that the first management processor is unable to correctly run the process.

7. A method as recited in claim 1, wherein migrating the process to a second management processor on a second line card is based at least in part on load balancing.

8. A method as recited in claim 1, wherein migrating the process to a second management processor on a second line card includes restarting the process on the second management processor.

9. A method as recited in claim 1, wherein the services directory includes one or more of an address of the second management processor and one or more ports of the second management processor on which the process is available.

10. A method as recited in claim 1, wherein one or more task managers included in the set of task managers are associated with one or more control/data plane processors.

11. A method as recited in claim 1, wherein the first line card and the second line card are included in a set of line cards and the request for the process is received from a sending line card included in the set of line cards.

12. A method as recited in claim 1, wherein the first line card and the second line card are included in a set of line cards; one or more line cards in the set of line cards include a management processor, a control/data plane processor, or both a management processor and a control/data plane process; and the request for the process is received from the management processor, the control/data plane processor, or both of a sending line card included in the set of line cards.

13. A method as recited in claim 1, wherein directing the request to the second management processor on the second line card includes searching a services directory of a task manager for the process and determining that the process is associated with the second management processor.

14. A method as recited in claim 1, wherein directing the request to the second management processor on the second line card includes providing one or more of an address of the second management processor and one or more port numbers at which the process is available on the second management processor.

15. A method as recited in claim 1, wherein the first management processor and the second management processor are included in a set of management processors and wherein each management processor in the set of management processors is associated with a module of a network device.

16. A method as recited in claim 15, wherein one or more management processors in the set of management processors are interconnected by a private network.

17. A method as recited in claim 15, wherein one or more management processors in the set of management processors function as a cluster of peers.

18. A method as recited in claim 15, wherein a module comprises a line card.

19. A method as recited in claim 1, wherein the first line card and the second line card are included in a set of line cards and the set of line card is included in a network device.

20. A method as recited in claim 19, wherein the network device comprises a router and/or gateway.

21. A method as recited in claim 1, wherein the process is associated with a service.

22. A method as recited in claim 1, wherein the process is associated with monitoring one or more features of an associated network device.

23. A method as recited in claim 1, wherein the process is associated with configuring one or more features of an associated network device.

24. A method as recited in claim 1, wherein the process is associated with managing one or more features of an associated network device.

25. A network device, comprising:
- a set of line cards, wherein each line card includes a management processor, a first line card included in the set of line cards includes a first management processor that implements a process, and the process is migrated from the first management processor to a second management processor on a second line card included in the set of line cards upon failure;
- a set of task managers, wherein each line card included in the set of line cards includes a task manager included in the set of task managers, each task manager included in the set of task managers is configured to decouple individual planes to thereby allow for a majority of the functionality of each plane to be independent from that of the other planes, wherein the individual planes comprise a management plane, control plane and data plane; separate each process on each plane by associating each process with a single feature and facilitate the migration of the process, track the migration of the process, or both, and each task manager included in the set of task managers directs a request for the process to the second management processor; and
- a feature server configured and initialized for enabling correct operation of the feature including recovery of feature components
- wherein each task manager included in the set of task managers includes a services directory that provides the location of a service, and migrating the process to a second management processor on a second line card includes updating the services directory of each task manager included in the set of task managers so that the process is associated with the second management processor in the services directory of each task manager included in the set of task managers.

26. A network device as recited in claim 25, wherein each task manager included in the set of task managers comprises a software module.

27. A computer program product for providing access to a process, the computer program product being embodied in a computer non-transitory readable medium and comprising computer instructions for:
- decoupling individual planes to thereby allow for a majority of the functionality of each plane to be independent from that of the other planes, wherein the individual planes comprise a management plane, control plane and data plane;
- separating each process on each plane by associating each process with a single feature;
- configuring and initializing a feature server for enabling correct operation of the feature including recovery of feature components;
- determining that a process on a first management processor on a first line card on the network device has at least in part failed;
- migrating the process to a second management processor on a second line card on the network device;
- receiving a request for the process; and
- directing the request to the second management processor on the second line card wherein the first line card and the second line card are included in a set of line cards, the first management processor and the second management processor are included in the set of management processors, at least one of a set of task managers is associated with each management processor included in the set of management processors;
- wherein each task manager included in the set of task mangers includes a services directory that provides the location of a service, and mi gratin the process to a second management processor on a second line card includes updating the services directory of each task manager included in the set of task managers so that the process is associated with the second management processor in the services directory of each task manager included in a set of task managers.

* * * * *